United States Patent [19]

Walter

[11] Patent Number: 5,137,195

[45] Date of Patent: Aug. 11, 1992

[54] UTILITY RACK FOR A VEHICLE

[75] Inventor: Richard J. Walter, Westlake Village, Calif.

[73] Assignee: Ski Tote, U.S.A., Camarillo, Calif.

[21] Appl. No.: 670,033

[22] Filed: Mar. 15, 1991

[51] Int. Cl.$^5$ ............................................... B60R 9/00
[52] U.S. Cl. ................................... 224/315; 224/324; 224/329; 224/917; 224/322
[58] Field of Search ............... 224/315, 329, 330, 331, 224/322, 323, 325, 326, 309

[56] References Cited

U.S. PATENT DOCUMENTS

| | | |
|---|---|---|
| 2,196,341 | 4/1940 | Rush . |
| 2,268,958 | 1/1942 | Parten et al. ......................... 224/323 |
| 2,833,453 | 5/1958 | Barreca . |
| 3,239,115 | 3/1966 | Bott et al. . |
| 3,601,294 | 8/1971 | Gjesdahl . |
| 3,638,844 | 2/1972 | Bronson . |
| 3,719,297 | 3/1973 | Nowicki . |
| 4,108,342 | 8/1978 | Riva ................................ 224/42.01 |
| 4,253,594 | 3/1981 | Parks ................................. 224/318 |
| 4,372,470 | 2/1983 | Dallaire ............................. 224/323 |
| 4,726,499 | 2/1988 | Hoerner ............................ 224/314 |
| 4,728,019 | 3/1988 | Olliges .............................. 224/329 |
| 4,765,521 | 8/1988 | Finnegan .......................... 224/315 |

Primary Examiner—Linda J. Sholl
Attorney, Agent, or Firm—Sheldon & Mak

[57] ABSTRACT

A utility rack is provided that may be swiftly and easily attached to the exteriors of vehicles of various sizes. The utility rack has a carrier bar containing a hollow compartment. A rubber band or a spring inside the hollow compartment is attached at either end to a non-elastic strap which extends from the hollow compartment and outside the carrier bar to hooks or other anchors detachably affixed to anchor points on the vehicle. Locking mechanisms are mounted on the carrier bar to lock the non-elastic straps to the carrier bar by a pawl mechanism or by a pin. The utility rack is placed on the vehicle by pulling on the non-elastic straps and placing their respective anchors on the anchor points of the vehicle and then locking the non-elastic straps to the carrier bar by means of the pawl and ratchet mechanisms or pin-perforated strap locking mechanims.

24 Claims, 4 Drawing Sheets

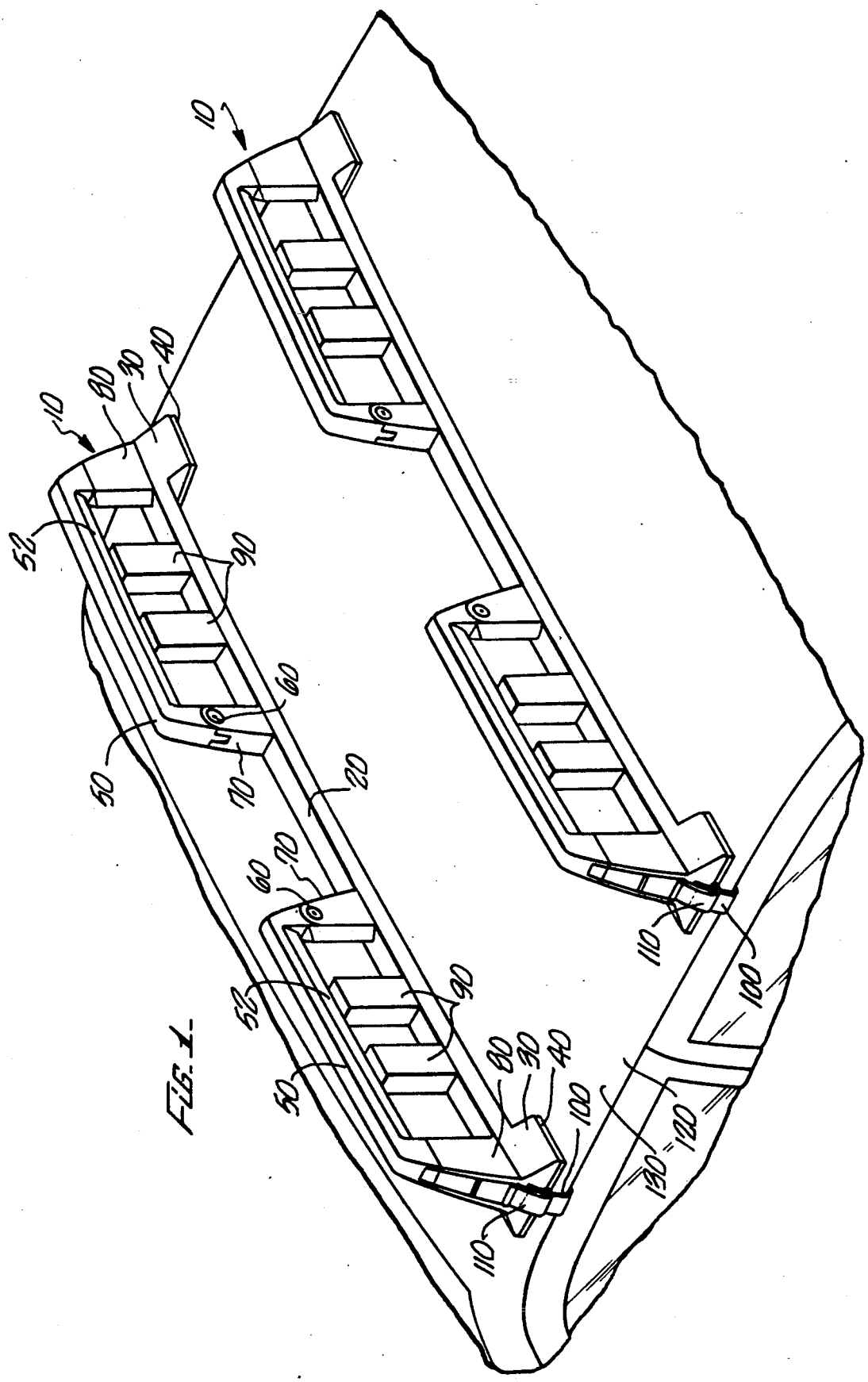

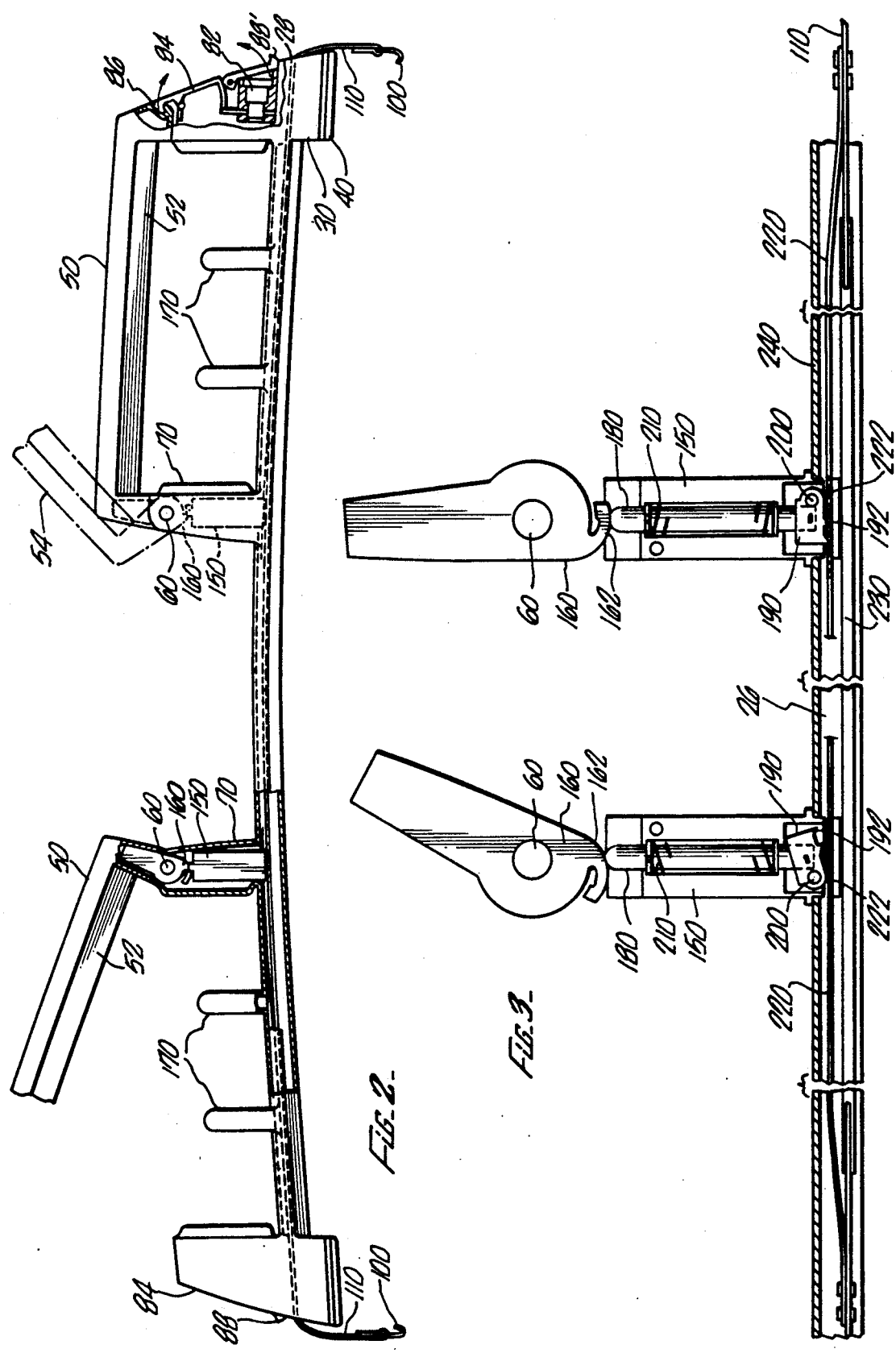

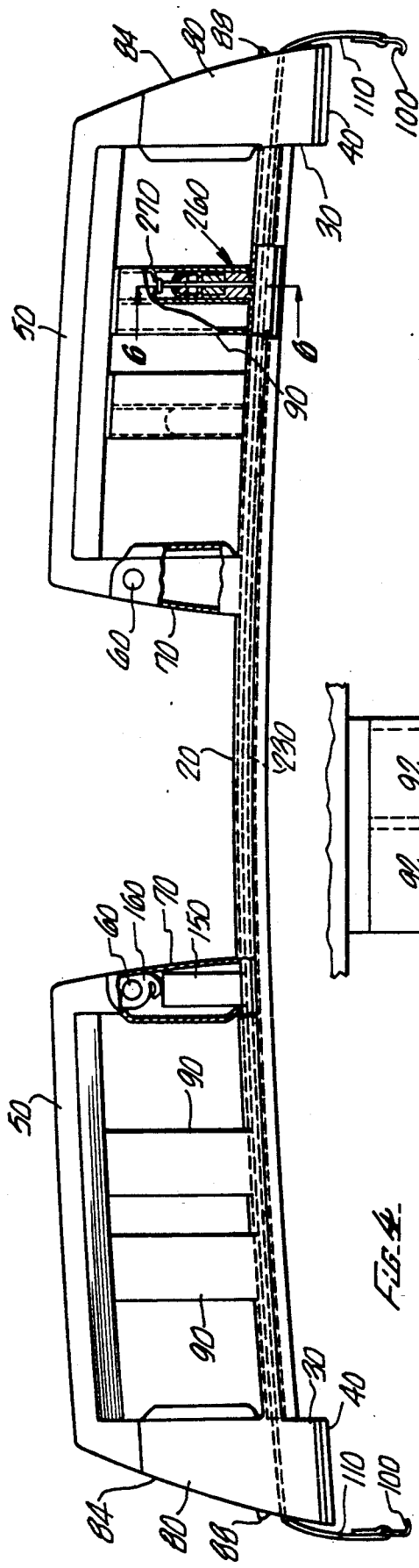

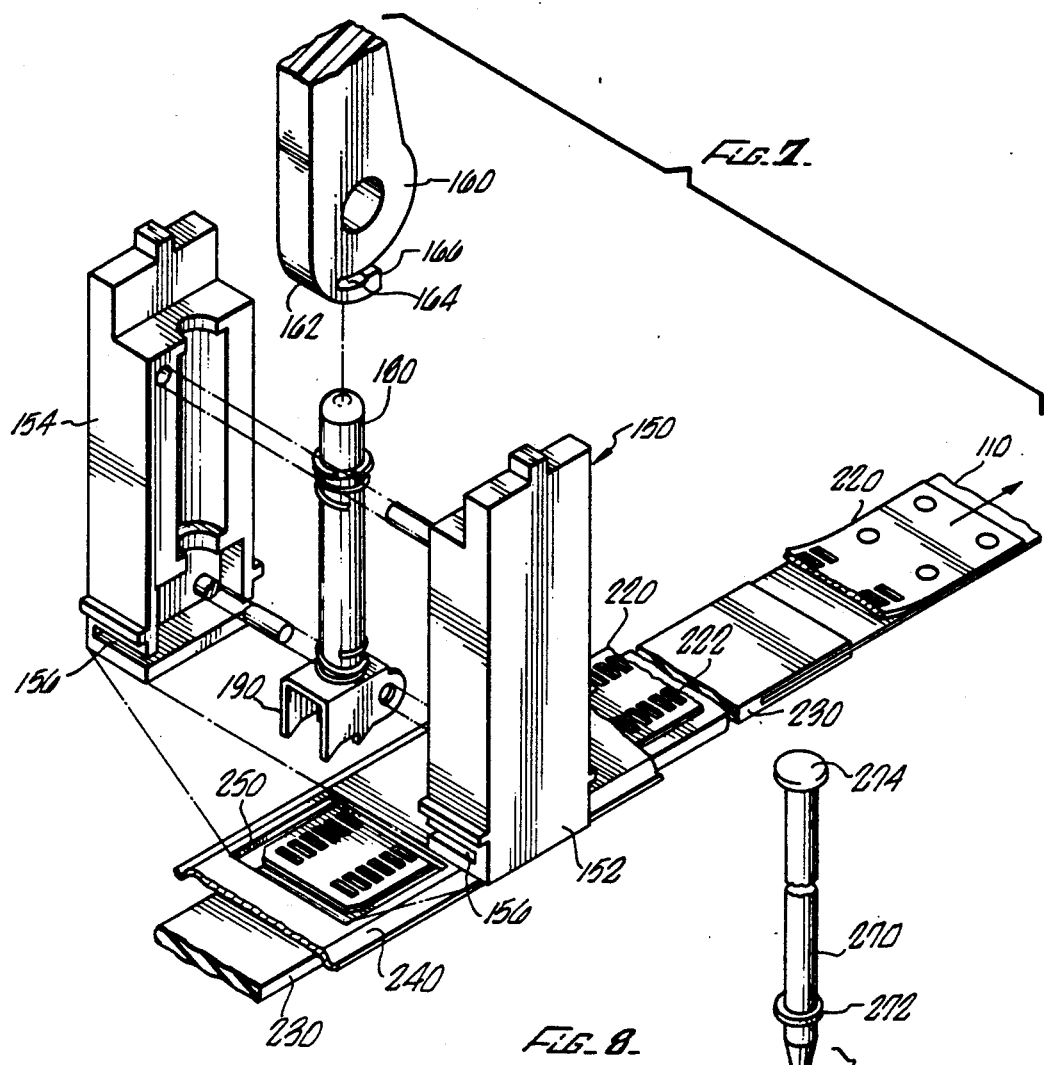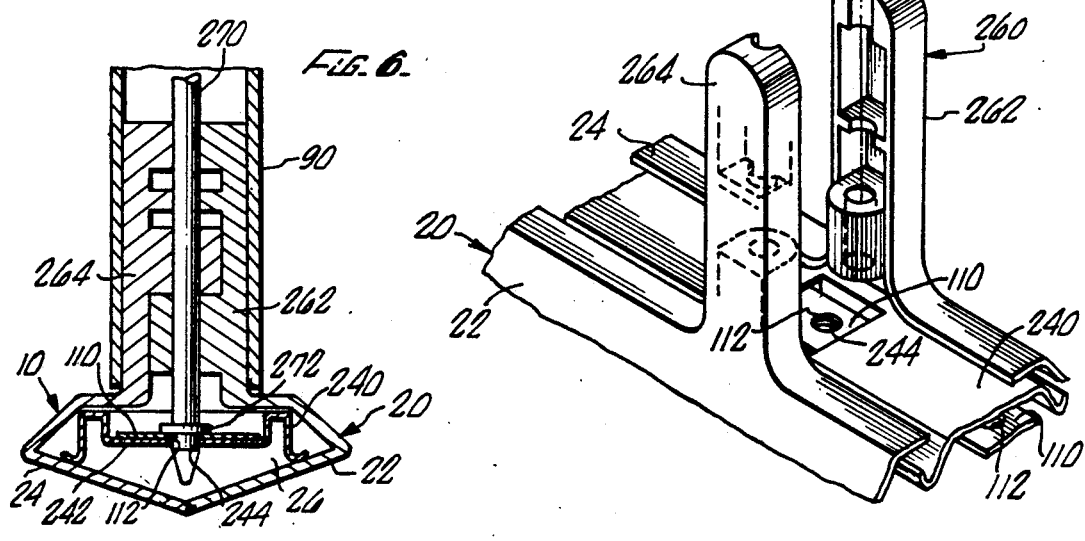

UTILITY RACK FOR A VEHICLE

BACKGROUND OF THE INVENTION

1. Field of the Invention

The field of the invention is that of package and article carriers, and, in particular, package and article carriers borne by a vehicle.

2. Description of the Related Art

Owners of vehicles frequently need to carry objects on the exterior, rather than the interior, of their vehicles. This may be because the objects are too long and awkward to place inside, such as skis and ski poles, snow boards, sleds, toboggans, canoes, kayaks, surfboards, wheelchairs, and bicycles, or simply because the available storage space inside the vehicle is insufficient. Accordingly, many devices have been designed over the years which are intended to be fastened to a vehicle for the purpose of carrying such objects.

Racks are commonly attached to the roofs of vehicles to carry such objects as skis, canoes, and bicycles. Examples of utility racks intended to be mounted on the roof of a vehicle are disclosed in Barreca U.S. Pat. No. 2,833,453, Bott et al. U.S. Pat. No. 3,239,115, Gjesdahl U.S. Pat. No. 3,601,294, Bronson U.S. Pat. No. 3,638,844, Nowicki U.S. Pat. No. 3,719,297, and Olliges U.S. Pat. No. 4,728,019. The utility racks in these patents include elongated members which extend across the roof, from one side of the vehicle to the other, and are anchored to trough-like rain gutters along the sides of the roof. The elongated members may be supported directly by the rain gutter or may be supported by legs or suction cups which rest against or adhere by suction to the roof of the vehicle.

Another common and important place for an external carrier is on the trunk or at the rear of a vehicle. This is a desirable position because some people do not have the upper body strength necessary to lift objects onto the roof carriers of a vehicle and therefore the objects should be mounted lower on the vehicle. This is especially the case when wheelchairs are to be carried, because these are rather heavy objects. An example of a carrier which fastens to the trunk or rear of a vehicle is disclosed in Hoerner U.S. Pat. No. 4,726,499.

Regardless of the place of attachment, a carrying device such as a utility rack must meet certain criteria. For example, it must be firmly attached to the vehicle so that the carrier and the supported object do not part company with the vehicle during turns, accelerations, decelerations, and other sudden movements. The carrier must also be strong enough to bear the weight of the intended load. The carrier should be secured to the vehicle in such a way that it is not easily stolen. This frequently involves the use of a lock of some kind. The carrier should not scratch the paint finish or otherwise damage the vehicle to which it is attached. Preferably, the carrier should not require the installation of permanent mounting devices so that the vehicle requires no alterations whatsoever and will retain its original appearance when the carrier is removed. The carrier should be inexpensive to make and should be adjustable to vehicles of different sizes and configurations. The carrier also should be easy to attach and remove from the vehicle.

A need exists for a utility rack which adequately meets all of the above listed criteria.

SUMMARY OF THE INVENTION

Accordingly, an object of the present invention is to provide a utility rack for attachment to a vehicle which will meet the above listed criteria.

The utility rack for vehicle of the invention comprises a carrier bar which may be mounted upon the exterior of a vehicle and is held onto the vehicle at each end by non-elastic straps connected to anchors affixed to the vehicle, means for elastically urging at least one of the non-elastic straps towards the carrier bar, and means for locking the non-elastic straps to the carrier bar.

In a preferred version, the carrier bar is hollow. A non-elastic strap is attached to either end of an elastic member such as a rubber band or spring contained in the hollow compartment in the carrier bar. The non-elastic straps emerge from the carrier bar at approximately either end of the carrier bar and attach to anchors which are to be connected to anchoring points on the vehicle, such as rain gutters at the edges of the roof of the vehicle. The non-elastic straps are pulled apart so as to engage the anchors to the appropriate anchoring points on the vehicles. The elastic member then draws the non-elastic straps toward each other and thereby keeps the carrier bar pressed against the vehicle. The carrier bar supports locking means, such as a pin which engages one of the holes in a perforated strip attached to a non-elastic strap or a toothed plate which engages holes in a perforated strip attached to a non-elastic strap, which lock the non-elastic straps to the carrier bar and thus prevent its removal either by an unauthorized person or by accelerations, decelerations or sudden turns.

The utility rack according to the invention, however, can be attached to trunk lids and virtually any other place on a vehicle where two anchor points can be located. In addition, the utility rack according to the invention can be designed to support practically any externally carried object.

Thus, the carrier bar can support other structures which are adapted to carry such objects as skis, snow boards, toboggans, canoes, kayaks, surfboards, bicycles, wheelchairs, and the like. In addition, containers for loose goods may be mounted upon the racks. The utility rack according to the invention may also be mounted on a trunk. It could be anchored, for example, to hooks placed on either side of the trunk lid.

The more important features of the invention have been outlined very broadly. Additional features of the invention exist that will be set forth below in the detailed description of the preferred embodiment.

BRIEF DESCRIPTION OF THE DRAWINGS

FIG. 1 is a perspective view of the roof of the vehicle with two utility racks, each containing a preferred embodiment of the invention;

FIG. 2 is a plan view of a utility rack containing a first version of the preferred embodiment of the invention;

FIG. 3 is cutaway plan view of a portion of the utility rack shown in FIG. 2;

FIG. 4 is a plan view with partial cutaways of a utility rack containing a second version of the preferred embodiment of the invention;

FIG. 5 is a plan view with partial cutaway of a pin locking mechanism used in the second version of the preferred embodiment of the invention;

FIG. 6 is a cross-section of the pin locking mechanism taken along line 6—6 in FIG. 4;

FIG. 7 is an exploded perspective view of a locking mechanism used in the preferred embodiment of the invention; and FIG. 8 is an exploded perspective view of a pin locking mechanism used in the second version of the preferred embodiment of the invention.

DETAILED DESCRIPTION OF THE PREFERRED EMBODIMENT

Turning now to FIG. 1 in the drawings, two utility racks 10 containing the preferred embodiment of the invention are shown mounted crosswise on the roof of a vehicle. The vehicle is indicated generally by reference numeral 130. Each utility rack 10 has a carrier bar 20.

Each utility rack 10 contains two arms 50. The arms 50 hold gear onto the utility rack 10. Each arm 50 rotates about a hinge 60 formed in an inside post 70. The inside posts 70 rise from the top of the carrier bar 20 close to the center of the carrier bar 20. The inside posts 70 are integrally formed with the carrier bar 20, as are the outside posts 80 which contain locks (see FIG. 2) to lock the arms 50 in the down position. The towers 90 fit between the arms 50 and the carrier bar 20. Their purpose is to divide and align objects carried by the utility rack. The towers 90 fit over the fingers 170 (see FIGS. 2 and 4). Fingers 170 are integrally formed with the carrier bar 20.

The utility rack 10, in the version shown in the drawings, is attached by the hooks 100 to the trough-like rain gutters 120 located at the edge of the roof of the vehicle 130. Other anchor means and anchor points are possible, such as hooks that fasten to door jambs, trunk lids, and the like. The hooks 100 in turn are each fastened to a strap 110. The straps 110 pass into and are secured in the interior of the carrier bar 20, in a manner to be described below.

The locking mechanisms for the arms 50 are located in the outside posts 80. Each outside post 80 contains a lock 82 that is normally concealed by a hinged lock cover 88. When the lock 82 is unlocked by the insertion and turning of the appropriate key, the thumb piece 84 may be pushed inward, rotating the catch 86 integrally formed in the thumb piece 84 away from the arm 50 and thus permitting the arm 50 to rotate upwards as shown in phantom in FIG. 2 (indicated by reference numeral 54).

Each carrier bar 20 is provided with a reinforcing plate 240 that fits inside the hollow compartment 26 in the carrier bar 20. The reinforcing plate 240 strengthens the carrier bar 20 and is thus preferably formed from a metal such as aluminum or mild steel.

The carrier bar 20, the integrally formed supporting legs 30, the inside posts 70, and the outside posts 80 are formed from a thermoplastic, preferably by injection molding. The same is true of the arms 50 and the towers 90. The pads 40 on the supporting legs 30 are formed from a plastic that is preferably somewhat soft in order to avoid damaging the paint finish of the vehicle. The hooks 100 preferably are formed from a strong and durable material such as metal or Kevlar® synthetic material. The straps 110 should be essentially inelastic and flexible (i.e., they should be able to bend but not stretch in any significant amount) and be resistant to cutting in order to prevent theft. In the preferred embodiment, these straps are formed from aluminum or stainless steel strips covered with a protective material, such as webbing, rubber or a thermoplastic coating in order to eliminate abrasion and give the strap a softer feel. The straps could also be formed from any strong, non-elastic, flexible, and cut-resistant material.

Turning now to FIGS. 2 and 3, a first version of the preferred embodiment of the invention is shown. FIG. 3 best shows how the two straps 110 are connected by an elastic member 230 which is preferably formed as a rubber strap. The elastic member 230 could also be a spring. The elastic member 230 tends to draw the two straps 110 toward each other and toward the center of the carrier bar 20. This permits a variation in the distance between the two hooks 100 and thus enables the utility rack to fit different vehicles with different roof widths. The straps 110 and the elastic member 230 fit within a hollow compartment 26 inside the carrier bar 20. The straps 110 emerge from the hollow compartment 26 by the slots 28 formed in the carrier bar 20.

The utility rack 10, as described thus far, may be attached to the roof of virtually any vehicle by simply placing the utility rack 10 on top of the roof of the vehicle crossways, attaching one of the hooks 100 to a rain gutter 120, and then attaching the other hook 100 to the rain gutter on the other side of the roof. The elastic member 230 will stretch as required to allow the hooks 100 to attach to the rain gutters 120. The utility rack 10, however, must be more securely fastened to the roof of the vehicle because it has to withstand accelerations caused by speeding up, slowing down, and turns. The utility rack 10 has to be able to withstand these accelerations with a full load. In addition, the utility rack 10 should be capable of being locked to the roof of the vehicle to prevent theft.

These purposes are accomplished by providing mechanisms which lock the straps 110 with respect to the carrier bar 20. In the preferred embodiment of the invention described here, the straps 110 are locked to the reinforcing plate 240 contained in the hollow compartment 26 of the carrier bar 20.

FIGS. 2 and 3 show a first version of the preferred embodiment of the invention in which two locking cassettes 150 are provided to lock the straps 110 with respect to the carrier bar 20. FIG. 4 shows a second version of the preferred embodiment of the invention in which a locking cassette 150 and a locking pin 270 are provided to lock the straps 110 with respect to the carrier bar 20.

Turning now to the first version of the preferred embodiment of the invention (FIGS. 2 and 3), two locking cassettes 150 are shown mounted in the inside posts 70. Each locking cassette contains an actuator arm 180 hingably attached to a toothed piece 190 which in turns rotates about the rod 200. The spring 210 urges the actuator arm 180 upwards and thus rotates the toothed piece 190 upwards.

Each locking cassette 150 is mounted directly on the reinforcing plate 240. A dual perforated strip 220 containing perforations 222 is fastened (preferably by riveting) to the strap 110 and passes through the bottom of the locking cassette 150. The dual perforated strip 220 extends inwardly from its attachment point on the strap 110 and is long enough to permit the strap 110 to be locked in any desired position with respect to the carrier bar 20.

As is perhaps best seen in FIG. 3, hinge arms 160 are mounted in the arms 150 and rotate about the hinges 60. Each hinge arm 160 has a camming surface 162 which rotates against the actuator arm 180. When the arm 50 is down and locked, the camming surface 162 forces the actuator arm 180 downwards, against the force of the spring 210. The actuator arm 180 then causes the toothed piece 190 to rotate downwards so that the teeth 192 engage the perforations 222 in the dual perforated strip 220. The strap 110 is then prevented from being drawn any further out of the carrier bar 120. The inclination of the teeth 192 provide a ratcheting effect in which the dual perforated strip 220 can slide further into the hollow compartment 26 of the carrier bar 20, but the strap 110 may not be pulled out further.

When the arms 50 are unlocked, permitting the arms 50 to rotate about the hinges 60 and away from the outside post 80, the camming surface 162 of each hinge arm 160 permits the actuator arm 180 to rise (urged by spring 210), and thus allows the toothed piece 190 to rotate up, disengaging from the dual perforated strip 220.

The dual perforated strip is preferably formed from a flexible metal strip, such as stainless steel.

The dual perforated strip and the construction of the locking cassette 150 from a first cassette half 152 and a second cassette half 154 are best shown in the exploded view of FIG. 7. An aperture 250, provided in the reinforcing plate 240, permits the insertion of the locking cassette 150. The dual perforated strip 220 passes into the locking cassette 150 through the cassette slot 156 in order to be engaged by the toothed piece 190.

The camming surface 162 of the hinge arm 160 has a flex slot 164 formed behind it (see FIGS. 3 and 7) which permits some give in forcing the actuator arm 180 down. This is necessary because the teeth 192 of the toothed piece 190 may not fit into the perforations 222 on the strip 220 when the actuator arm 180 is driven down by the rotation of the hinge arm 160, and thus the actuator arm 180 will stop at a higher position until the dual perforated strip moves sideways enough to permit the teeth 192 to enter the perforations 222. A stop 166 is formed in the end of the camming surface 162 so that the actuator arm 180 is forced down a certain minimum distance when the arm 50 is locked to the outside post 80.

In a second version of the preferred embodiment according to the invention, only one locking cassette 150 is provided. This will permit the locking of one of the straps 110 when the corresponding arm 50 is shut. The other strap 110 is locked by a locking pin 270, which is best shown in FIGS. 5, 6, and 8. Locking pin 270 is mounted in locking finger 260, which is adapted to vertically and slidingly accept the locking pin 270. Locking pin 270 is preferably formed of a strong plastic or a metal like aluminum alloy or brass.

The locking finger 260, as is best seen in FIG. 8, is formed from a first locking finger half 262 and a second locking finger half 264, which are integrally formed together with the two halves 22 and 24 of the carrier bar 20. Strap 110 passes over the platform 242 underneath the locking finger 260. The platform 242 is stamped out of the reinforcing plate 240. The strap 110 is thereby exposed below the locking finger 260 so that the locking pin 270 may enter one of the perforations 112 in the strap 110. The platform 242 has a perforation 244 which is also sized to receive the locking pin 270. The locking pin 270 can thus lock the strap 110 with respect to the carrier bar 20. The shoulder 272 on the locking pin 270 prevents that pin from being driven down too far into the platform 242.

The tower 90 is placed over the locking finger 260 and prevents the locking pin 270 from being pulled up when the arm 50 is locked down over the tower 90. This prevents unauthorized removal of the rack because the strap 110 cannot be pulled out of the carrier bar 20. The thrust tabs 92 in the towers 90 will press down on the head 274 of the locking pin 270, thereby pushing the locking pin 270 against the strap 110.

In order to use the second version of the preferred embodiment of the invention, the user places the utility rack as desired on the roof of his or her vehicle and then presses the head 274 of the locking pin 270 until the locking pin 270 penetrates a perforation 112 in the strap 110. The user then puts the tower 90 over the locking finger 260 and thereafter does not adjust the length of the strap 110 emerging from that side of the utility rack. The rack is now set on that side of the utility rack for that particular vehicle. To use the utility rack 10 on another vehicle, the head 274 of the locking pin 270 is pulled upward and the process repeated.

The locking cassette 150 on the other side of the utility rack will not lock the strap 110 on that side of the utility rack when the arm 50 is up. This will permit the appropriate degree of flexibility necessary for removal and attachment of the utility rack on a vehicle.

The advantage of the second version of the preferred embodiment of the invention is that it requires only one locking cassette 150. This reduces the cost and complexity of the utility rack according to the invention.

Other anchors for the ski rack may be provided besides the hooks 100; all that is necessary is two anchors and two anchor points on the vehicle. In a co-pending application, I disclose flexible anchors which may be hardened after achieving the necessary shape to engage the door jamb of a vehicle or a trunk lid.

Thus, a utility rack for vehicles has been provided. Those skilled in the art will appreciate that the conception upon which this disclosure is based may be used as a basis for the designing of other structures, for carrying out the several purposes of the invention. The claims, therefore, should be regarded as including equivalent constructions as do not depart from the spirit and the scope of the invention, which are intended to be defined by the appended claims.

What is claimed is:

1. A utility rack for attachment to a first anchoring site on a vehicle, comprising:
 a. a carrier bar;
 b. a first strap for attaching the carrier bar to the first anchoring site;
 c. elastic means attached to the first strap for elastically urging the first strap toward the carrier bar when the first strap is attached to the first anchoring site, the elastic means being sufficiently elastic that the first strap can be detached from the first anchoring site by stretching the elastic means;
 d. locking means attached to the carrier bar for releasably locking the first strap to the carrier bar when the locking means is in a locking position so that the elastic means can no longer be stretched to remove the first strap from the first anchoring site.

2. A utility rack for attachment to first and second anchoring sites comprising:
 a. a carrier bar having first and second bar ends, the carrier bar having a hollow compartment extending through the carrier bar and having a first opening substantially near the first bar end and a second opening substantially near the second bar end;

b. a stretchable elastic member contained within the hollow compartment in the carrier bar, the elastic member having first and second member ends;

c. a first strap attached to the elastic member for attaching the carrier bar to the first anchoring site, the first strap emerging from the first opening;

d. a second strap attached to the elastic member for attaching the carrier bar to the second anchoring site, the second strap emerging from the second opening, the first and second straps being made of a flexible and substantially non-elastic material;

e. first and second locking means supported by the carrier bar for releasably locking the first and second straps, respectively, to the carrier bar in first and second locking positions of the locking means, respectively, so that the elastic member is prevented from stretching to remove the first and second straps, respectively, from attachment to the first and second anchoring sites, respectively, the elastic member stretching to allow the first and second straps to be moved from attachment to the first and second anchoring sites, respectively, when the first and second locking means, respectively, are in first and second non-locking positions, respectively.

3. The utility rack of claim 2 wherein the elastic member comprises a rubber straps.

4. A utility rack for attachment to a first anchoring site, comprising:

a) a carrier bar;

b) a first strap for attaching the carrier bar to the first anchoring site;

c) stretchable elastic means elastically attaching the first strap to the carrier bar for allowing the first strap to be pulled from the carrier bar by stretching the elastic means to attach the carrier bar to the first anchoring site, and wherein the first strap is sufficiently short that the first strap is under tension when it is attached to the first anchoring site; and d) locking means supported by the carrier bar for preventing the elastic means from being stretched to remove the first strap from the first anchoring site when the locking means is in a locking position.

5. The utility rack of claim 1 or 4 further comprising a second strap for attaching the carrier bar to a second anchoring site.

6. The utility rack of claim 5 wherein the elastic means is elastically attached to the second strap for allowing the second strap to be pulled from the carrier bar by stretching the elastic means to attach the carrier bar to the second anchoring site, wherein the second strap is sufficiently short that the second strap is under tension when it is attached to the second anchoring site.

7. The utility rack of claim 1, 2, or 4 wherein the first strap is made of a flexible, substantially non-elastic material.

8. The utility rack of claim 1 or 4 wherein the elastic means comprises a rubber strap.

9. The utility rack of claim 1, 2, or 4 further including ratcheting means for allowing the first strap to move toward the carrier bar to increase tension on the first strap when the locking means is in the locking position.

10. The utility rack of claim 1, 2, or 4 wherein the locking means further comprises (1) a substantially non-elastic perforated strip attached to the first strap and (2) a toothed piece attached to the carrier bar for selectively engaging the perforated strip in the locking position.

11. The utility rack of claim 10 wherein the locking means further includes ratcheting means for ratcheting the toothed piece in the locking position so that the toothed piece (1) disengages the perforated strip when the first strap is moved toward the carrier bar to increase tension on the first strap and (2) engages the perforated strip thereby preventing the elastic means from stretching to reduce tension on the first strap when the first strap is urged away from the carrier bar.

12. The utility rack of claim 10 wherein the locking means has a non-locking position and further comprises:

(a) an actuator arm attached to the carrier bar and the toothed piece;

(b) a spring attached to the actuator arm for urging the toothed piece and the actuator arm away from the perforated strip to disengage the toothed piece from the perforated strip; and (c) camming means for forcing the actuator arm to move the toothed piece into engagement with the perforated strip in the locking position, and for releasing the actuator arm so that the spring moves the toothed piece into disengagement with the perforated strip in the non-locking position.

13. The utility rack of claim 1, 2, or 4 wherein the locking means comprises a locking strap attached to the carrier bar and a locking pin simultaneously engagable in the locking position with the first strap and the locking strap.

14. The utility rack of claim 10 further comprising a hollow compartment in the carrier bar containing the perforated strip for making the perforated strip inaccessible from outside the carrier bar in the locking position.

15. A utility rack for attachment to a first anchoring site, comprising:

(a) a carrier bar;

(b) a first strap attached to the carrier bar for attaching the carrier bar to the first anchoring site;

(c) stretchable elastic means elastically attaching the first strap to the carrier bar (i) for allowing the first strap to be pulled from the carrier bar by stretching the elastic means to attach the carrier bar to the first anchoring site, and wherein the first strap is sufficiently short that the first strap is under tension when it is attached to the first anchoring site, and (ii) for stretching to allow the first strap to be pulled from the first anchoring site to detach the carrier bar from the first anchoring site;

(d) locking means supported by the carrier bar for preventing the elastic means from stretching to reduce tension on the first strap when the utility rack is attached to the first anchoring site in a locking position of the locking means, the locking means having (1) a substantially non-elastic perforated strip attached to the first strap and (2) a toothed piece attached to the carrier bar selectively engagable with the perforated strip in the locking position.

16. The utility rack of claim 15 wherein the locking means further comprises ratcheting means for ratcheting the toothed piece in the locking position so that the toothed piece (1) disengages the perforated strip when the first strap is moved toward the carrier bar to increase tension on the first strap and (2) engages the perforated strip thereby preventing the elastic means from stretching to reduce tension on the first strap when the first strap is urged away from the carrier bar.

17. The utility rack of claim 15 wherein the locking means further has a non-locking position and further comprises:
(a) an actuator arm attached to the carrier bar and the toothed piece;
(b) a spring attached to the actuator arm for urging the toothed piece and the actuator arm away from the perforated strip to disengage the toothed piece from the perforated strip; and
(c) camming means for forcing the actuator arm to move the toothed piece into engagement with the perforated strip in the locking position, and for releasing the actuator arm so that the spring moves the toothed piece into disengagement with the perforated strip in the non-locking position.

18. A utility rack for attachment to a first anchoring site on a vehicle, comprising:
a) a rigid carrier bar having first and second bar ends and a center portion between the first and second bar ends;
b) a first strap attached to the carrier bar for attaching the carrier bar to the first anchoring site, the first strap being made of a flexible, substantially non-elastic material;
c) stretchable elastic means elastically attaching the first strap to the carrier bar for allowing the first strap to be pulled from the carrier bar by stretching the elastic means to attach the carrier bar to the first anchoring site, and wherein the first strap is sufficiently short that the first strap is under tension when it is attached to the first anchoring site; and
d) an outside post attached to the carrier bar proximate its first bar end;
e) a rack arm rotatably attached to the carrier bar proximate the center portion of the carrier bar, the rack arm rotating between an up position and a down position, the rack arm being lockable to the outside post in the down position, there being sufficient space between the rack arm and the outside post for loading items onto the utility rack when the rack arm is in its up position;
f) first locking means supported by the carrier bar proximate its center portion for preventing the elastic means from being stretched to remove the first strap from the first anchoring site when the rack arm is in its down position, and for allowing the elastic means to be stretched freely when the rack arm is in its up position, the first locking means comprising:
i) a substantially non-elastic perforated strip attached to the first strap;
ii) a toothed piece engagable with the perforated strip;
iii) an actuator arm attached to the carrier bar and the toothed piece;
iv) a spring attached to the actuator arm for urging the toothed piece and the actuator arm away from the perforated strip to disengage the toothed piece from the perforated strip;
v) camming means attached to the rack arm for forcing the actuator arm to move the toothed piece into engagement with the perforated strip when the rack arm is in its down position, and for releasing the actuator arm so that the spring moves the toothed piece into disengagement from the perforated strip when the rack arm is in its up position; and
vi) ratcheting means for ratcheting the toothed piece in the down position of the rack arm so that the toothed piece (1) disengages the perforated strip when the first strap is moved toward the carrier bar to increase tension on the first strap and (2) engages the perforated strip thereby preventing the elastic means from stretching to reduce tension on the first strap when the first strap is urged away from the carrier bar.

19. The utility rack of claim 18 further comprising a second strap attached to the carrier bar for attaching the carrier bar to a second anchoring site on the vehicle.

20. The utility rack of claim 19 wherein the elastic means is elastically attached to the second strap for allowing the second strap to be pulled from the carrier bar by stretching the elastic means to attach the carrier bar to the second anchoring site, and wherein the second strap is sufficiently short that the second strap is under tension when it is attached to the second anchoring site.

21. The utility rack of claim 20 further comprising second locking means proximate the second bar end, the second locking means having a locking strap attached to the carrier bar and a locking pin simultaneously engagable with the second strap and the locking strap in a locking position of the second locking means.

22. The utility rack of claim 18 wherein the camming means comprises a hinge arm attached to the rack arm and rotating therewith, the hinge arm having a camming surface (1) for forcing the actuator arm to move the toothed piece into engagement with the perforated strip in the down position of the rack arm and (2) for releasing the actuator arm so that the toothed piece disengages the perforated strip in the up position of the rack arm.

23. The utility rack of claim 22 wherein the hinge arm further comprises a flex slot behind the camming surface for providing sufficient flex in the camming surface so that the actuator arm can stop at an intermediate position when the toothed piece is in less than full engagement with the perforated strip and the rack arm is in its down position.

24. The utility rack of claim 18 wherein the ratcheting means comprises perforations in the perforated strip and inclined teeth on the toothed piece, the teeth (1) engaging the perforations to prevent the elastic means from stretching to reduce tension on the first strap and (2) disengaging the perforations to increase tension on the first strap when the first strap is moved toward the carrier bar, in the down position of the rack arm.

* * * * *